United States Patent [19]

Fukuma

[11] 3,804,188

[45] Apr. 16, 1974

[54] WEIGHTING SCALE

[75] Inventor: Yoshitaka Fukuma, Nara, Japan

[73] Assignee: Sharp Kabushiki Kaisha, Osaka, Japan

[22] Filed: Dec. 16, 1971

[21] Appl. No.: 208,596

[30] Foreign Application Priority Data
Dec. 26, 1970 Japan.............................. 45-127730
Aug. 4, 1971 Japan.............................. 46-59127

[52] U.S. Cl............ 177/25, 177/DIG. 1, 177/DIG. 6
[51] Int. Cl....................... G01g 23/22, G01g 23/42
[58] Field of Search............................. 177/25–29, 177/DIG. 1, DIG. 6, 3; 235/58 PS, 61 PS

[56] References Cited
UNITED STATES PATENTS

| | | | |
|---|---|---|---|
| 3,370,660 | 2/1968 | Takahashi............................ | 177/25 |
| 3,513,922 | 5/1970 | Schwarz................................ | 177/25 |
| 3,741,324 | 6/1973 | Boshinski et al....................... | 177/3 |
| 2,747,797 | 5/1956 | Beaumont..................... | 177/DIG. 1 |
| 2,963,222 | 12/1960 | Allen ............................ | 177/DIG. 1 |
| 3,193,032 | 7/1965 | Martin .......................... | 177/DIG. 6 |
| 3,608,655 | 9/1971 | Ray et al......................... | 177/DIG. 1 |
| 3,627,069 | 12/1971 | Ray et al......................... | 177/DIG. 6 |
| 3,045,229 | 7/1962 | Allen ................................ | 177/27 X |
| 3,177,957 | 4/1965 | Alder et al......................... | 177/25 X |
| 3,453,422 | 7/1969 | Susor................................ | 177/25 X |
| 3,521,039 | 7/1970 | Susor................................ | 177/25 X |
| 3,528,517 | 9/1970 | Martin.............................. | 177/25 X |

*Primary Examiner*—Stephen J. Tomsky
*Assistant Examiner*—Stanley J. Witkowski
*Attorney, Agent, or Firm*—Flehr, Hohbach, Test, Albritton & Herbert

[57] ABSTRACT

The present disclosure is directed to a weighing scale which generally comprises a spring mechanism, an A-D converter and an electronic calculating unit. Under conditions of load an indicating pointer makes a circular movement, its angular displacement corresponding to the weight of the load. The angular displacement of the pointer is photoelectrically sensed by motor-driven scanning means mechanically isolated from the weighing scale mechanism which generates a train of pulses the number of which is proportional to the weight.

10 Claims, 8 Drawing Figures

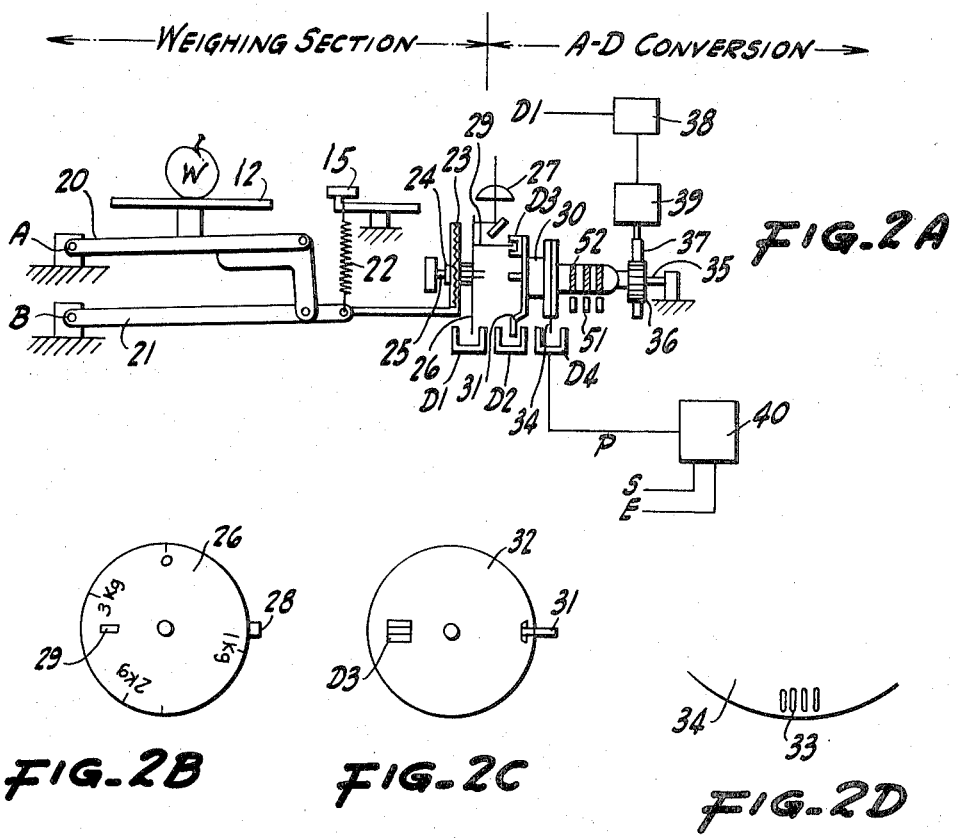
FIG. 2A
FIG. 2B
FIG. 2C
FIG. 2D
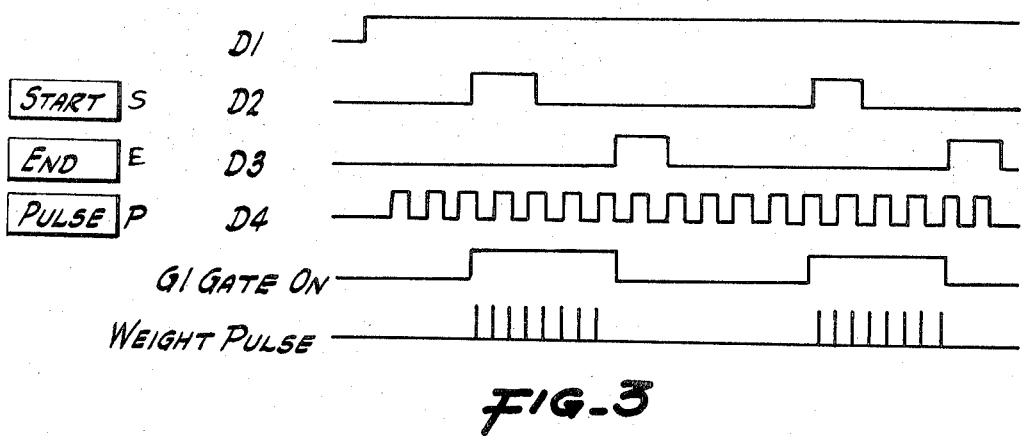
FIG. 3

WEIGHTING SCALE

BACKGROUND OF THE INVENTION

This invention relates to a weighing scale having an electronic computing system capable of multiplying unit price by weight signals and more particularly to an improved scale provided with an A-D converter wherein the traces of the indicating pointer are scanned by a disc rotating at a fixed speed to produce a train of pulses corresponding to the weight.

A mechanical scale combined with an A-D converter and a computing system has previously been put in commercial use. In such an electronic scale owing to mechanical coupling of the A-D converter with the weight detecting mechanism the weighing mechanism itself is liable to be overloaded to destroy machine accuracy and the A-D converter becomes complex at the same time.

According to conventional A-D conversion system the movable code plate is attached to the weighing mechanism, and upon loading the code plate swings in proportion to the weight of the load. The displacements proporting to the weight are then led out by photoelectrically sensing a code pattern affixed to the code plate thereby obtaining digital information of the measured weight value. However, since the A-D converter should be coupled to the weighing mechanism of spring type, additional load is inflicted on the spring mechanism and the plural photo-sensing elements are indispensable so that the A-D converter becomes complex and expensive.

In another type of conventional apparatus wherein a disc type pulse generator is fixed to the weight detecting portion, a series of pulses are generated in response to movement of the detecting means and are then counted in order to carry out an A-D conversion. Damped vibration of the platter results in necessity of providing a reversible counter; that operates as an up-counter for forward displacement of the platter and as a down-counter for a reverse one. Furthermore, in a case where the counter is in an erroneous state due to errors or the like, the counter is unable to perform a correction of any erroneous state.

OBJECTS AND SUMMARY OF THE INVENTION

Accordingly, th primary object of this invention is to provide an improved electronic computing scale which avoids one or more of the disadvantages and limitations of the above conventional system.

Another object of this invention is to provide an improved weighing scale which ensures high reliability by using a motor-driven scanning means.

Still another object of this invention is to provide a weighing scale which needs no up-down counter by merely providing a full-adder and registers.

A further object of this invention is to provide a weighing scale combined with an improved A-D converter which is capable of repeating an A-D conversion for obtaining digital weight information.

It is still a further object of this invention to provide a weighing scale wherein the weighing unit and the A-D conversion unit are mechanically isolated each other so that an unreasonable force is not applied to the weighing unit to increase the degree of accuracy.

Another object of this invention is to provide a pulse counting type scale which is capable of renewing the calculated price information after the replacement of the platter is stable.

In summary, the solution of the previous problems according to this invention consists essentially in that, in addition to an indicating pointer linked to the weighing unit, a sensing means is used and installed to a motor-driven disc and the position of the sensing means relative to the indicating pointer is sensed to substantially sense displacements of the indicating pointer whereby analog weight information is converted into digital weight information. Thus, this invention refers primarily to an improved weighing scale which comprises weighing means having an indicating pointer and converting weight of an article to be weighed into displacements of the indicating pointer, a movable member traveling along a line of movement of the indicating pointer, means for driving the movable member, means for sensing the position of the indicating pointer, means for generating pulses corresponding to the weight of the article in response to the sensing operation and means for operating the generated pulses.

BRIEF DESCRIPTION OF THE DRAWINGS

FIGS. 2(A) through 2(D) are graphs showing a mechanism of weight detection arrangement combined with an A-D converter in accordance with this invention.

FIG. 3 is a timing chart showing the relative phases of various control and information signals.

DESCRIPTION OF THE PREFERRED EMBODIMENTS

Figure 1A:
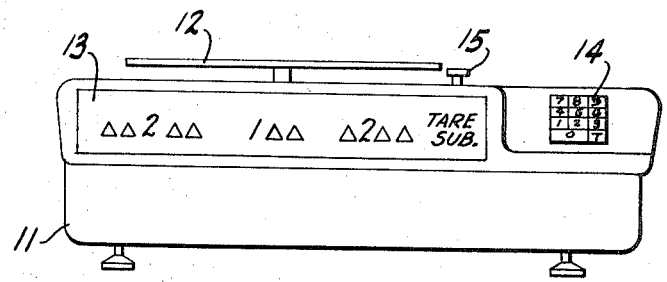
FIGS. 1(A) and 1(B) are perspective views of the weighing scale.
Figure 1B:
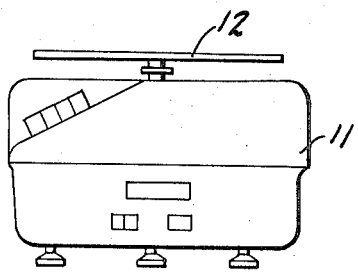

An electronic weighing scale 11 as shown in FIGS. 1(A) and 1(B) is basically provided with a platter 12, on which an article to be measured is mounted, and an indicating device 13 which displays contents of unit price, weight and calculated price information. The unit price and the weight information is respectively with three digits and four digits. The calculated price information is altogether indicated with five digits. The scale 11 is also provided with a key-board 14 having ten numeral keys for unit price and a function key for tare calculation. The scale 11 is also provided with an adjusting knob 15 for a zero-point check.

The spring type weight system combined with the A-D converter which is a material features of this invention is shown in FIGS. 2(A) through 2(D). In the following description it is assumed that a weighing range is 0–3 kg., a maximum displacement angle is 300° and a minimum graduation is 5g. that is, one weight pulse corresponds to 5g. Only unit price information per 100g. is able to be preset.

The illustrated arrangement may be divided into a spring type weighing section and an A-D conversion section. The platter 12 is linked to a first lever 20 and a second lever 21 which will rotate respectively on its axes A and B against a spring 22 under conditions of load. The displacements of the levers 20, 21 are transferred to a graduated disc 26 through a pair of rack 23 and pinion 24. Analog weight information on the graduated disc 26 may be indicated through a lens 27. As shown in FIG. 2(B) the disc 26 has a degree range of 0 – 300 which is provided with weight graduations in a range of from 0 – 3kg. A shutter 28 for detecting a zero-point and an indicating pointer 29 for an END signal are respectively mounted on the disc 26. When the scale 11 is loaded the indicating pointer 29 makes circular movement the angle of which is proportional to the weight of the load W.

In order to convert the analog displacements of the indicating pointer 29 into digital weight information or weight pulses of which the number corresponds to the weight value, a movable member 30 secured to a rotating axis 35 which is separated from another axis 25 for the graduated disc 26. The movable member 30 comprises a sensing disc 32, as shown in FIG. 2(C), provided with a detecting element D3 for weight displacements and a shutter 31 for the START signal, and a pulse generating disc 34, as shown in FIG. 2(D), provided with a plurality of apertures 33 for generating pulses at a fixed interval, for example, 1'. Brushes 51 and brush rings 52 are installed to the axis 35 to lead out the outputs from the detecting element D3. In addition, the axis 35 for the movable member 30 is driven by a motor 39 through a transmission unit of a worm wheel 37 and a worm gear 36 and a motor control circuit 38.

Each detecting element D1 through D4 is a photoelectric detecting unit having a light-emitting element and a photo-sensitive element and is energized in response to an appearance of the shutter between both elements. The first detecting element D1 is used to sense whether the indicating pointer 29 is at a zero-point. If the scale is in a zero-point state the shutter 28 attached to the graduated disc 26 will block light path within the detecting unit D1. In an actual embodiment the shutter 28 and the detecting unit D1 are so shaped and arranged that upon the reception of the output from the detecting unit D1 the motor 39 starts rotating when the load more than 10g. is mounted. The second detecting unit D2 for the START signal is positioned at a point corresponding to a zero-point of the scale and is operative to sense a zero-position of the movable member 30 to generate the START signal by sensing the arrival of the shutter 31 attached to the sensing disc 32. The third detecting unit D3 for the END signal is actuated when the rotating angle of the movable member 30 coincides with the displacement angle of the indicating pointer 29. The last detecting unit D4 for weight pulses is close to a series of the apertures 33 of the generating disc 34 and with rotation of the movable member 30 the detecting unit D4 is operative to generate weight pulses P in response to interrupted light.

In the A-D converting process the load W of the article on the platter 12 is converted into weight pulses P proportional to the weight of the load W. When the load W is placed on the platter 12 the indicating pointer 29 starts rotating through the spring weighing mechanism and the detecting unit D1 senses photoelectrically such movement of the pointer 29. Upon the appearance of the output from the unit D1 the motor control circuit 38 is actuated to drive the motor 39, which rotates at a fixed speed in a forward direction of movement of the pointer 29. Therefore, the movable member 30 is so rotated as to follow movement of the pointer 29. At the same time the detecting unit D2 is operative to sense a reference marker corresponding to its zero-point and the START signal is feed out. According to the instruction of the START signal the weight pulses P from the detecting unit D4 are allowed to enter into the arithmetic unit 40 and accordingly count operation of the weight pulses P is initiated.

During the weighing process the indicating pointer 29 makes a damped vibration and thereafter stops vibrating and movement of the indicating pointer 29 becomes stable. Irrespective of damped movement of the pointer 29 the movable member 30 continues to scan the line of movement of the pointer at a fixed rate. Under balanced conditions the END signal will not be read out until the rotating angle of the movable member 30 coincides with the displacement angle of the pointer 29. It should be noted that the indicating pointer related with the weighing section is mechanically separated from the scanning disc 32 and the pulse generating means 34 and thus the scanning and sensing disc 32 does not trace damped movement of the indicating pointer. Of course, the sensing device 32 continues constantly to rotate in a certain direction.

The END signal indicates the stop of the counting operation of weight pulses P. However, as long as the load W is mounted, the motor 39 continues to rotate and the scanning and sensing operation mentioned above is, therefore, repeatedly carried out. That is, whenever a displacement of the pointer exists, the detecting element D1 is in a conductive state and is operative to indicate energization of the motor 39. After one complete revolution of the movable member 30 the same returns to a starting position and the above acanning operation is repeated; The START signal is feed out from the detecting unit D2 again and the counting of the weight pulses P is renewed. As a result, even when vibrations of the indicating pointer remain for a comparatively long period, several operations of scanning are carried out and correct counting of the weight pulses becomes possible. Furthermore, even when the counter is in an error state due to noise, it is able to correct the error state during the next succeeding scanning process.

In such a way, the START signal and the END signal serve as gating inputs for a train of pulses from the detecting unit D4 and the passed pulses correspond to weight pulses P indicative of the digital weight information. The weight pulses P converted into digital information will be treated in the computing system in order to obtain the calculated total price information.

Whereas in the above described embodiment the detecting units D1 through D4 have comprised photoelectric sensing devices any other form of suitable detecting device may be used, as for example magnetic sensing devices. It will be also appreciated from the above description that the spring weighing mechanism may be replaced by any conventional weighing mechanisms of another types.

The scanning process and the weight pulses counting principles described hereinbefore will be apparent with reference to FIG. 3 showing the relative phases of the START signals and the END signals and the weight pulses W. As shown in this drawing, during a period which corresponds to time phase between both leading edges of the START signal and the END signal, the weight pulse information P of which the pulse number is proportional to the weighed analog value is counted and stored in the computing system 40 and thereafter the weight pulse information P is treated in the computing system.

Figure 4:
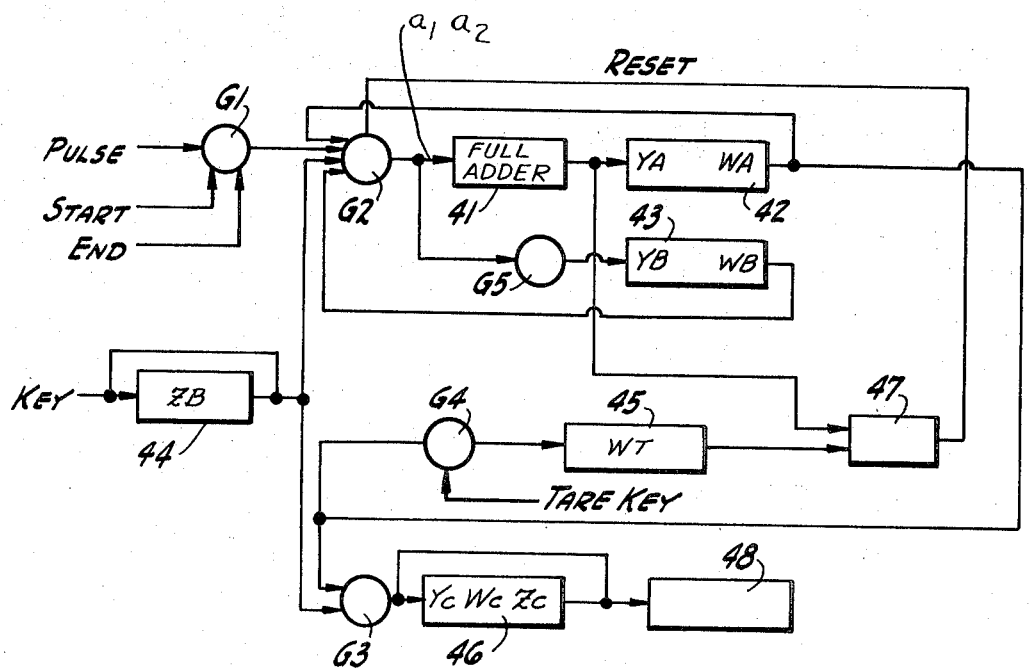
FIG. 4 is a block diagram showing a circuit arrangement of the weighing scale in accordance with this invention.

An electronic circuit arrangement for operating the price calculation and indicating the resulting total price information is schematically shown in FIG. 4. In this drawing symbols W, Y and Z designate the weight information, the price information and the unit price information. An electronic computing scale 11 combined with the above-mentioned A-D converter consists essentially of information storage systems, a calculating system and an indicating system. The information storage system contains a first register 42 of 64 bits, a second register 43 of 64 bits, a unit price register 44 of 12 bits, a tare register 45 of 8 bits and an output register 46 of 64 bits. The first register 42 stores the price information YA and the weight information WA and likewise the second register 43 stores the price information YB and the weight information WB. In addition, the output register 46 stores serially the calculated price information YC, the digital weight information WC and the preset unit price information ZC respectively, and are operative to perform the price calculation or multiplication of weight x unit price. The indicating system 48 consisting of a plurality of indicating tubes is connected to the output register 46 for indicating the weight (WC), the price (YC) and the unit price (ZC) information. A plurality of gates G1 through G5 is also provided. When the load W is mounted on the platter 12, the motor starts rotating as mentioned above and the A-D converter is actuated to generate the START signal. The START signal opens the gate G1 and then weight pulses are entered into the calculating unit. Two kinds of operations of WA + 1 → WA, YA + ZB → YA take place repeatedly by the full-adder 41 and the first register 42. Finally, an END signal from the A-D converter closes the gate G1 and terminates the operations. Gate G2 is reset by a pulse from logic unit 47 which is driven by outputs from full-adder 41 and tare register 45.

The above-mentioned calculations are so carried out that one weight pulse corresponds to 1g., while in the following system the A-D converter and the weighing unit is so constructed that one weight pulse corresponds to 5g. and it is thus necessary to multiply the weight pulses by 5.

Upon the appearance of the END signal the X5 calculation is carried out. First of all the contents WA and YA of the first register 42 are simultaneously introduced to two input terminals $a_1$ and $a_2$ of the full adder 41 to perform the X2 calculation of (WA, YA) + (WA, YA) → 2(WA, YA) and secondly X4 calculation of 2(WA, YA) + 2(WA, YA) → 4(WA, YA) is carried out in the same manner. Thereafter the contents WA, YA of the second register 43 and the results 4(WA, YA) of the X4 multiplication are simultaneously applied as an input to the full-adder 41 thereby accomplishing the X5 operation of WB, YB + 4(WA, YA) → 5(WA, YA). After the price calculation the results of the X5 multiplication is transferred to the output register 46 by opening the gate G3 and at the same time the unit price information ZB is entered into the same register 46. As a result, the weight (WC), the price (YC) and the unit price (ZC) information stored in the output register 46 are respectively indicated by a plurality of the indicators 48.

I claim:

1. A weighing scale comprising: weighing means having an indicating pointer and converting weight of an article to be weighed into displacement of an indicating pointer, a movable member mounted to travel along a line of movement of the indicating pointer, means for continuously driving the movable member at a fixed rate, means connected to said movable member for sensing the displaced position of the indicating pointer, means coupled to said movable member for generating a train of pulses the number of which correspond to the weight of the article and responsive to said sensing means sensing the position of said pointer to terminate said pulse train.

2. A weighing scale according to claim 1 which further comprises means for detecting a zero-point of the weighing means and means for actuating the driving means for the movable member in response to the detecting means detecting a non-zero condition.

3. A weighing scale according to claim 1 wherein the sensing means comprises means for sensing a reference pointer attached to the movable member for initiating said pulse train.

4. A weighing scale according to claim 1 wherein the weighing means comprises a platter on which the article is mounted and the indicating pointer is associated with the platter to cause a displacement angle proportional to the weight of the article.

5. A weighing scale according to claim 1 wherein the sensing means comprises a light-emitting element and a photo-sensitive element said indicating pointer serving as a shutter between such elements.

6. A weighing scale according to claim 1 wherein the driving means for the movable member is actuated under conditions of load and is non-actuated under conditions of no load.

7. A weighing scale according to claim 1 wherein the weighing means is mechanically separated from the sensing means and the generating means.

8. A weighing scale according to claim 1 wherein a graduated disc is associated with the indicating pointer within the weighing means to visually indicate in an analog manner weighed value of the article outside.

9. A weighing scale according to claim 1 which comprises means for presetting and storing unit price information and means for multiplying the preset unit price information by the number of pulses in said pulse train each of which is proportional to the weight of the article.

10. A weighing scale according to claim 1 wherein the driving means is operative to repeat the sensing operation of the sensing means.

* * * * *